US011259542B2

(12) United States Patent
Jacob et al.

(10) Patent No.: US 11,259,542 B2
(45) Date of Patent: Mar. 1, 2022

(54) APPARATUS FOR DELIVERING FROZEN CONFECTION COMPRISING PARTICULATE MATERIAL

(71) Applicant: Conopco, Inc., UNILEVER, Englewood Cliffs, NJ (US)

(72) Inventors: Varkey Berty Jacob, Bedford (GB); Frederick Jethro Harrison, Melbourn (GB); Mark John Pawulski, Bishops Stortford (GB); Paul Scott, Histon (GB); Andrew Julian Stockdale, Haslingfield (GB); Benjamin John Strutt, Cambridge (GB)

(73) Assignee: Conopco, Inc., Englewood Cliffs, NJ (US)

( * ) Notice: Subject to any disclaimer, the term of this patent is extended or adjusted under 35 U.S.C. 154(b) by 166 days.

(21) Appl. No.: 16/067,901

(22) PCT Filed: Dec. 9, 2016

(86) PCT No.: PCT/EP2016/080423
§ 371 (c)(1),
(2) Date: Jul. 3, 2018

(87) PCT Pub. No.: WO2017/118521
PCT Pub. Date: Jul. 13, 2017

(65) Prior Publication Data
US 2020/0375212 A1 Dec. 3, 2020

(30) Foreign Application Priority Data

Jan. 8, 2016 (EP) ..................................... 16150643

(51) Int. Cl.
*A47J 43/10* (2006.01)
*A23G 9/04* (2006.01)
(Continued)

(52) U.S. Cl.
CPC .................. *A23G 9/28* (2013.01); *A23G 9/08* (2013.01); *A23G 9/48* (2013.01)

(58) Field of Classification Search
CPC ........ A23G 9/04–045; A23G 9/08–086; A23G 9/10–106; A23G 9/28–288; A47J 31/4496; A47J 43/10–1093
See application file for complete search history.

(56) References Cited

U.S. PATENT DOCUMENTS 2,130,113 A 9/1938 Adams
2,579,724 A 4/1946 Breakstone
(Continued)

FOREIGN PATENT DOCUMENTS

CN 1034895 8/1989
CN 2190525 3/1995
(Continued)

OTHER PUBLICATIONS

Co-pending Application: Applicant: Scott et al., U.S. Appl. No. 16/067,826, filed Jul. 3, 2018.
(Continued)

*Primary Examiner* — Michael A Laflame, Jr.
(74) *Attorney, Agent, or Firm* — Gerard J. McGowan, Jr.

(57) ABSTRACT

An apparatus for delivering particulate material to a frozen confectionery material to provide a single serving to a consumer. The apparatus comprises a chamber for storing the particulate material, and a supply of frozen confectionery. The chamber has an open exit, wherein the chamber is adapted to be rotatable in use such that the open exit follows a pathway having both an upper region and a lower region, and arranged to pass through the lower region at a non-zero speed a plurality of times during a single serving. The open exit is sized to allow a portion of stored particulate material to fall out of the chamber via the open exit under gravity
(Continued)

each time the open exit passes through the lower region of the pathway. The apparatus also is arranged to bring particulate material that has left the chamber into contact with the supply of frozen confectionery.

16 Claims, 5 Drawing Sheets

(51) Int. Cl.
   *A23G 9/10*      (2006.01)
   *A23G 9/28*      (2006.01)
   *A23G 9/08*      (2006.01)
   *A23G 9/48*      (2006.01)

(56) References Cited

U.S. PATENT DOCUMENTS

| | | |
|---|---|---|
| 2,764,385 A | 9/1956 | Sieling |
| 3,052,381 A | 4/1962 | Carpigiani |
| 3,536,925 A | 10/1970 | Schmidt |
| 4,162,030 A | 7/1979 | Capra |
| 4,447,458 A | 8/1984 | Roth et al. |
| 4,491,064 A * | 1/1985 | Schmidt ............ A23G 9/045 366/101 |
| 4,645,093 A | 2/1987 | Jones |
| 4,711,376 A | 12/1987 | Manfroni |
| 4,878,760 A | 7/1989 | Newton et al. |
| 5,150,820 A | 9/1992 | McGill |
| 5,199,609 A | 4/1993 | Ash, Jr. |
| 5,368,195 A | 11/1994 | Pleet |
| 5,421,484 A | 6/1995 | Beach |
| 5,463,878 A | 7/1995 | Parekh et al. |
| 5,492,249 A | 2/1996 | Beach |
| 5,494,194 A | 2/1996 | Topper et al. |
| 5,505,336 A | 4/1996 | Montgomery |
| 5,533,922 A | 7/1996 | Yamaharu |
| 5,556,268 A | 9/1996 | Topper |
| 5,788,120 A | 4/1998 | Stumler |
| 5,772,075 A | 6/1998 | Ash, Jr |
| 5,775,533 A | 7/1998 | Schroeder |
| 5,816,455 A | 10/1998 | Alpers |
| 6,068,160 A | 5/2000 | Fancher |
| 6,098,849 A | 8/2000 | McInnes |
| 6,145,701 A | 11/2000 | Van Der Merwe |
| 6,155,461 A | 12/2000 | Ishihara |
| 6,264,066 B1 * | 7/2001 | Vincent ............ A23G 9/228 222/105 |
| 6,299,025 B1 | 10/2001 | Watanabe |
| 6,378,740 B1 | 4/2002 | Martin |
| 6,435,377 B1 | 8/2002 | Iwata et al. |
| 6,453,803 B1 | 9/2002 | Sodeyama |
| 6,564,973 B1 | 5/2003 | Brown |
| 6,637,214 B1 | 10/2003 | Leitzke |
| 6,824,017 B2 | 11/2004 | Sluijter |
| 7,017,783 B1 | 3/2006 | Hunter et al. |
| 7,021,500 B1 | 4/2006 | Finn |
| 7,165,878 B1 | 1/2007 | Mimran |
| 7,178,976 B2 | 2/2007 | Gerber |
| 7,318,324 B2 | 1/2008 | Ultich et al. |
| 7,451,613 B2 | 11/2008 | Barraclough et al. |
| 7,540,376 B2 | 6/2009 | Mahieu |
| 7,621,669 B1 | 11/2009 | Gerber |
| 7,665,398 B2 | 2/2010 | Gerber |
| 7,837,065 B2 | 11/2010 | Furner |
| 7,886,903 B1 | 2/2011 | Wurzelbacher, Jr |
| 8,061,562 B2 | 11/2011 | Carpenter |
| 8,239,882 B2 | 7/2012 | Law |
| 8,297,182 B2 | 10/2012 | Cocchi et al. |
| 8,348,104 B2 | 1/2013 | Py |
| 8,905,458 B2 | 12/2014 | Pipp |
| 2001/0038019 A1 | 11/2001 | Vincent et al. |
| 2001/0050116 A1 | 12/2001 | Skell |
| 2002/0050496 A1 | 5/2002 | Van Der Meer |
| 2003/0066844 A1 | 4/2003 | Boal, Jr. |
| 2003/0142581 A1 * | 7/2003 | Barton ............ A47J 43/082 366/142 |
| 2003/0183090 A1 | 10/2003 | Binley et al. |
| 2004/0099695 A1 | 5/2004 | Finn |
| 2005/0067433 A1 | 3/2005 | Brandt et al. |
| 2005/0161469 A1 * | 7/2005 | Roady ............ B67D 1/0032 222/52 |
| 2005/0173469 A1 | 8/2005 | Lingenhoff |
| 2005/0218157 A1 | 10/2005 | McMahon |
| 2005/0230416 A1 | 10/2005 | McMahon |
| 2006/0006199 A1 * | 1/2006 | Shin ............ A23G 9/283 222/390 |
| 2006/0054614 A1 | 3/2006 | Baxter |
| 2006/0157152 A1 | 7/2006 | Wolski et al. |
| 2007/0194052 A1 | 8/2007 | McMahon |
| 2007/0199614 A1 | 8/2007 | Cocchi |
| 2007/0241140 A1 | 10/2007 | Cocchi |
| 2008/0317909 A1 | 12/2008 | Gispert et al. |
| 2009/0016150 A1 | 1/2009 | Mimran |
| 2010/0028778 A1 | 4/2010 | Schuch et al. |
| 2010/0116846 A1 | 5/2010 | Cortese |
| 2012/0048885 A1 | 3/2012 | Anderson |
| 2012/0052163 A1 | 3/2012 | Doleac et al. |
| 2013/0064943 A1 | 3/2013 | Feola |
| 2013/0136835 A1 | 5/2013 | Fiedler |
| 2014/0252029 A1 | 9/2014 | Kallgren |
| 2015/0043306 A1 | 2/2015 | Ubbesen |
| 2015/0101357 A1 * | 4/2015 | Ugolini ............ A23G 9/224 62/126 |
| 2015/0237884 A1 | 8/2015 | McGill |
| 2015/0320078 A1 | 11/2015 | Cocchi |
| 2016/0016785 A1 | 1/2016 | Tartler |
| 2016/0255859 A1 * | 9/2016 | Salerno ............ A23G 9/281 |

FOREIGN PATENT DOCUMENTS

| | | |
|---|---|---|
| CN | 1960640 | 5/2007 |
| CN | 1968738 | 5/2007 |
| CN | 201267164 | 7/2009 |
| CN | 104202997 | 12/2014 |
| CN | 203985912 | 12/2014 |
| CN | 204350996 | 5/2015 |
| DE | 10206383 | 8/2003 |
| EP | 1277411 | 1/2003 |
| EP | 1348342 | 10/2003 |
| EP | 1450318 | 8/2004 |
| EP | 1449441 | 12/2005 |
| EP | 1731040 | 12/2006 |
| EP | 1952699 | 8/2008 |
| EP | 2189067 | 5/2010 |
| EP | 2255673 | 12/2010 |
| EP | 2485627 | 9/2013 |
| FR | 2433362 | 4/1980 |
| FR | WO05100187 | 10/2005 |
| GB | 2234556 | 2/1991 |
| GB | 2418970 | 4/2006 |
| JP | 2001095495 | 4/2001 |
| JP | 2001299228 | 10/2001 |
| JP | 2003174848 | 6/2003 |
| JP | 2007282611 | 11/2007 |
| WO | WO9101090 | 2/1991 |
| WO | WO9414333 | 7/1994 |
| WO | WO9820747 | 5/1998 |
| WO | WO0064770 | 11/2000 |
| WO | WO03017776 | 3/2003 |
| WO | WO03096821 | 11/2003 |
| WO | WO2004026756 | 4/2004 |
| WO | WO04067386 | 8/2004 |
| WO | WO2005020703 | 3/2005 |
| WO | WO2005031226 | 4/2005 |
| WO | WO2005039303 | 5/2005 |
| WO | WO2005086749 | 9/2005 |
| WO | WO2006117274 | 11/2006 |
| WO | WO2007011624 | 1/2007 |
| WO | WO2007039158 | 4/2007 |
| WO | WO2007095441 | 8/2007 |
| WO | WO2008022300 | 2/2008 |
| WO | WO2008075190 | 6/2008 |

(56) References Cited

FOREIGN PATENT DOCUMENTS

| | | |
|---|---|---|
| WO | WO2009034592 | 3/2009 |
| WO | WO2009062875 | 5/2009 |
| WO | WO2011061344 | 5/2011 |
| WO | WO11081301 | 7/2011 |
| WO | WO2011162796 | 12/2011 |
| WO | WO2012056018 | 5/2012 |
| WO | WO2012084166 | 6/2012 |
| WO | WO2013070834 | 5/2013 |
| WO | WO2013124193 | 8/2013 |
| WO | WO2014145737 | 9/2013 |
| WO | WO2014081294 | 5/2014 |
| WO | WO2014186797 | 11/2014 |
| WO | WO2015169841 | 11/2015 |
| WO | WO2014166628 | 10/2018 |

OTHER PUBLICATIONS

Co-pending Application: Applicant: Naranjo et al., U.S. Appl. No. 16/067,829, filed Jul. 3, 2018.
Co-pending Application: Applicant: Naranjo; U.S. Appl. No. 16/067,838, filed Jul. 3, 2018.
Co-pending Application: Applicant: Cramer et al., U.S. Appl. No. 16/067,843, filed Jul. 3, 2018.
Co-pending Application: Applicant: Harrison et al., U.S. Appl. No. 16/067,866, filed Jul. 3, 2018.
Co-pending Application: Applicant: Crundwell et al., U.S. Appl. No. 16/067,880, filed Jul. 3, 2018.
IPRP2 in PCTEP2016080426; dated Mar. 21, 2018; pp. 1 to 9.
IPRP2 in PCTEP2016080427; dated Mar. 19, 2018; pp. 10 to 22.
IPRP2 in PCTEP2016080430; dated Mar. 19, 2018. pp. 23 to 33.
IPRP2 in PCTEP2016080428; dated Feb. 5, 2018; pp. 34 to 47.
Written Opinion 2 in PCTEP2016080427; dated Nov. 28, 2017. pp. 48 to 53.
Written Opinion 2 in PCTEP2016080423; dated Nov. 28, 2017. pp. 54 to 58.
Written Opinion 2 in PCTEP2016080424; dated Nov. 28, 2017. pp. 59 to 65.
Written Opinion 2 in PCTEP2016080430 ; dated Nov. 17, 2017. pp. 66 to 71.
Search Report and Written Opinion in PCTEP2016080423; dated Mar. 17, 2017. pp. 1 to 13.
Search Report & Written Opinion in PCTEP2016080425; dated Feb. 23, 2017. pp. 14 to 26.
Search Report and Written Opinion in PCTEP2016080426; dated Feb. 23, 2017. pp. 27 to 38.
Search Report and Written Opinion in PCTEP2016080428; dated Feb. 9, 2017. pp. 39 to 53.
Search Report and Written Opinion in PCTEP2016080424; dated Feb. 6, 2017. pp. 54 to 65.
Search Report and Written Opinion in EP16150663; dated Jun. 23, 2016. pp. 66 to 72.
Search Report & Written Opinion in EP16150661; dated Jun. 21, 2016. pp. 73 to 80.
Search Report & Written Opinion in EP16150632; dated Jun. 9, 2016. pp. 81 to 87.
Search Report & Written Opinion in EP16150643; dated Jun. 9, 2016. pages.
Search Report & Written Opinion in EP16150638; dated Jun. 1, 2016. pages.
Search Report & Written Opinion in EP16150660; dated Jun. 1, 2016. pages.
IPRP2 in PCTEP2016080431; dated Nov. 22, 2017. pages.
Search Report and Written Opinion in EP16150656; dated Jun. 21, 2016. pages.
Search Report and Written Opinion in PCTEP2016080427; dated Mar. 16, 2017. pages.
IPRP2 in PCTEP2016080429; dated Mar. 21, 2018. pages.
Search Report and Written Opinion in PCTEP2016080429; dated Feb. 23, 2017. pp. 68 to 81.
Written Opinion in PCTEP2016080429; dated Nov. 17, 2017. pp. 1 to 5.
Search Report and Written Opinion in PCTEP2016080430; dated Mar. 16, 2017. pp. 6 to 19.
Search Report and Written Opinion in EP16150648; dated Jun. 29, 2016. pp. 20 to 29.
Search Report and Written Opinion in EP16150649; dated Jun. 23, 2016. pp. 30 to 39.
Search Report and Written Opinion in PCTEP2016080431; dated Feb. 9, 2017. pp. 40 to 51.
IPRP2 in PCTEP2016080423; dated Mar. 19, 2018. pp. 52 to 64.
IPRP2 in PCTEP2016080425; dated Nov. 20, 2017. pp. 65 to 78.
IPRP2 in PCTEP2016080424; dated Mar. 26, 2018. pp. 79 to 86.

* cited by examiner

APPARATUS FOR DELIVERING FROZEN CONFECTION COMPRISING PARTICULATE MATERIAL

TECHNICAL FIELD

The invention relates to an apparatus for dispensing frozen confectionery, particularly a single serving thereof, comprising particulate material, particularly mixed-in particulate material.

BACKGROUND AND PRIOR ART

There is a significant consumer demand for frozen confectionery, particularly ice cream, which contains particulate material. When such particulate material is not merely added as a topping but is mixed into the frozen confectionery then they are also referred to as mix-ins.

Apparatus and machines exist which are capable of dispensing a frozen confectionery with a selection of mix-ins that have been selected by an end user.

U.S. Pat. No. 4,645,093 discloses an apparatus for dispensing a single serving of ice cream and comprises a hopper for containing nuts as a topping. The hopper has a rotatable valve at the bottom with two indents so that a half revolution dispenses a fixed quantity of nuts to the ice cream.

WO 2011/162796 discloses an apparatus which delivers ice cream and particulate material simultaneously as a single-serve. The particulate material can be dispensed by actuation of a lever to deposit the particles. Also disclosed are cylindrical metering devices where partial rotation of the cylinder delivers a fixed amount of particulate material from a hopper position above. Also disclosed is that the particulate material can be dispensed from a rotatable hopper that contains baffles. A particular combination of counter-clockwise and clockwise partial revolutions ensures that a fixed metered quantity of particulate material leaves the hopper per single serving.

EP 1348342 discloses an apparatus which delivers a single serving of ice cream containing particulate material. The particulate material is fed into a chamber comprising a rotary vane from above and the ice cream is fed into the chamber from the side whereup they mix together before being dispensed from the chamber from below.

Improvements in this area would therefore be highly desirable.

SUMMARY OF INVENTION

The invention relates to an apparatus for delivering particulate material to a frozen confectionery material to provide a single serving to a consumer, the apparatus comprising
 a chamber for storing the particulate material, and
 a supply of frozen confectionery,
the chamber having an open exit, wherein the chamber is adapted to be rotatable in use such that the open exit follows a pathway having both an upper region and a lower region, and arranged to pass through the lower region at a non-zero speed a plurality of times during a single serving; the open exit being sized to allow a portion of stored particulate material to fall out of the chamber via the open exit under gravity each time the open exit passes through the lower region of the pathway; the apparatus also being arranged to bring particulate material that has left the chamber into contact with the supply of frozen confectionery.

As such, the container passes through the lower region at a positive speed and therefore for a specific amount of time, so that a controlled quantity of particulate material can leave the container via the open exit. However, as the chamber is rotatable to bring the open exit to the lower region a plurality of times, the amount dispensed each time the open exit passes through the lower region can be a relatively low quantity of particulate material, in particular a quantity that is lower than would eventually be dispensed in the single serving.

It is intended that the container for the particulate material contains all the particulate material that is needed for at least one single serving. It is therefore not necessary for the container to be refilled each time it rotates through the upper region of the pathway. Thus, preferably the arrangement is such that when passing through the upper region of the pathway no particulate material enters the chamber.

In a convenient arrangement the rotating chamber rotates within a stationary housing. Such a stationary housing blocks the open exit but has an opening which overlaps with the open exit when it passes through the lower region of the pathway. This ensures that no particulate material leaves the container until it is in its lower region, and the overlap with the opening controls the amount of particulate material that may leave the chamber on a single pass through the lower region.

In a preferred embodiment the open exit and the opening in the stationary housing are shaped such that the region of overlap, as the open exit moves away from the lower region of the pathway and the region of overlap closes, is shaped to taper providing a gradual closing of the region of overlap. This gradual tapering provides a pinching and slicing effect, so that any particulate material that is trapped in the region of overlap as it reduces in size is broken and/or cut and/or sliced by the tapering region of overlap.

The chamber may rotate in a variety of different manners, however it has been found that rotation about a substantially horizontal axis, the pathway thereby being a substantially vertical circle, provides a convenient arrangement and one which is mechanically more simple to provide.

The chamber may rotate in a variety of different senses provided it is arranged to pass through the lower region a plurality of times during a single serving. However it has been found to be advantageous if the chamber is adapted to rotate in one sense only during a single serving. For example the chamber can rotate counter clockwise only or clockwise only. In particular this feature makes motorization of the rotation more simple and convenient as discussed below.

In one particularly convenient arrangement the container is not integrally formed with any other component of the apparatus. This allows the container to be removable and replaceable on a regular basis. As such an end user can then remove the container and add whatever particulate material they choose to the container. In this way the consumer is not restricted by the topping present in the machine and is free to add whatever they desire as their preference. Additionally, if there is more than one end user then each end user can have the particulate material they prefer. Furthermore the removal of the container facilitates cleaning of the container.

In a preferred apparatus, the supply of frozen confectionery is provided by extruding it through a nozzle simultaneously with the rotation of the chamber. In this way the continuous stream of frozen confectionary can be brought into contact with the semi-continuous flow of particulate material along its length so that the particulate material is distributed about the surface of the extruded frozen confectionery and therefore distributed in the single serving.

As discussed above, the open exit is arranged to pass through its lower region a plurality of times. It has been found to be particularly advantageous to arrange for the open exit to pass through the lower region at least 5 times during a single serving, preferably more than 10 times. In this way, only a fraction of the total amount of particulate material needs to leave the container during each pass through the lower region.

Although the container could be rotated by hand it is much preferred that it is motorized so that the rotation is provided by a motor. This assists in providing a rapid rotation speed which can provide the multiple revolutions per single serving that is preferred.

Such a motor can follow a fixed a pre-programmed routine. However in a preferred embodiment, the motor is controlled and actuatable by a user selectable input. In this way the end user can control the action of the rotation of the container and have control over the delivery or otherwise of the particulate material. Additionally this allows an end user to choose not to add any particulate material at all to a single serving, if that is the users preference on that occasion.

In one particularly preferred embodiment, the user selectable input allows variation in the speed of rotation of the chamber in use. In a further refinement of this embodiment however, it is preferred that the speed of rotation is fixed by the apparatus at a substantially constant value whilst the open exit overlaps with the opening in the housing, i.e. when the open exit is in its lower region. In this way, the amount of particulate material that leaves the open exit in each pass through the lower region is unaffected by the speed of rotation of the chamber. This allows the end user to increase or decrease the speed of rotation, as desired, according to whether more or less particulate material is desired for a single serving.

The apparatus as described and defined herein is primarily intended for use in the home. As such it is highly beneficial if the machine is not so sizable that it cannot readily be position in a user's kitchen for example. As such, it is preferred that the apparatus can fit inside a cuboid container having a volume of no greater than 0.2 $m^3$, preferably no greater than 0.1 $m^3$.

The frozen confectionery material of the present invention may be aerated. The term "aerated" means that gas has been intentionally incorporated into the product, such as by mechanical means. The gas can be any food-grade gas such as air, nitrogen or carbon dioxide. The extent of aeration is typically defined in terms of "overrun" (OR). In the context of the present invention, % overrun is defined in volume terms (measured at atmospheric pressure) as:

$$OR = \frac{\text{volume of frozen aerated product} - \text{volume of premix at ambient temp}}{\text{volume of premix at ambient temp}} \times 100$$

The amount of overrun present in the product will vary depending on the desired product characteristics. In the context of the present invention the level of overrun is typically from 0 to 150%, preferably from 60 to 150%, more preferably from 60 to 100%.

Frozen confection material means a confection made by freezing a pasteurized mix of ingredients such as water, fat, sweetener, protein (normally milk proteins), and optionally other ingredients such as emulsifiers, stabilizers, colours and flavours. Frozen confection materials may be aerated. Frozen confection materials include ice cream, gelato, frozen yoghurt, sorbets, granitas, shaved ices and the like. Preferably the frozen confectionery material is an ice cream.

The particulate material can include discrete pieces of an edible material, such as commercially available confectionery pieces, candy, carbonated candy, chocolate, fruit (which may be e.g. fresh, dried, frozen or sugar-infused), frozen liquids, nut, seed, biscuit, cake, cookie, toffee, cereal, fudge, nougat, jelly, marshmallow and the like. Preferably the particulate material is from 1 mm to 10 mm in size, more preferably from 2 to 9 mm, most preferably from 5 to 8 mm.

The invention will now be illustrated, by way of example only, and with reference to the following figures, in which.

Figure 1:
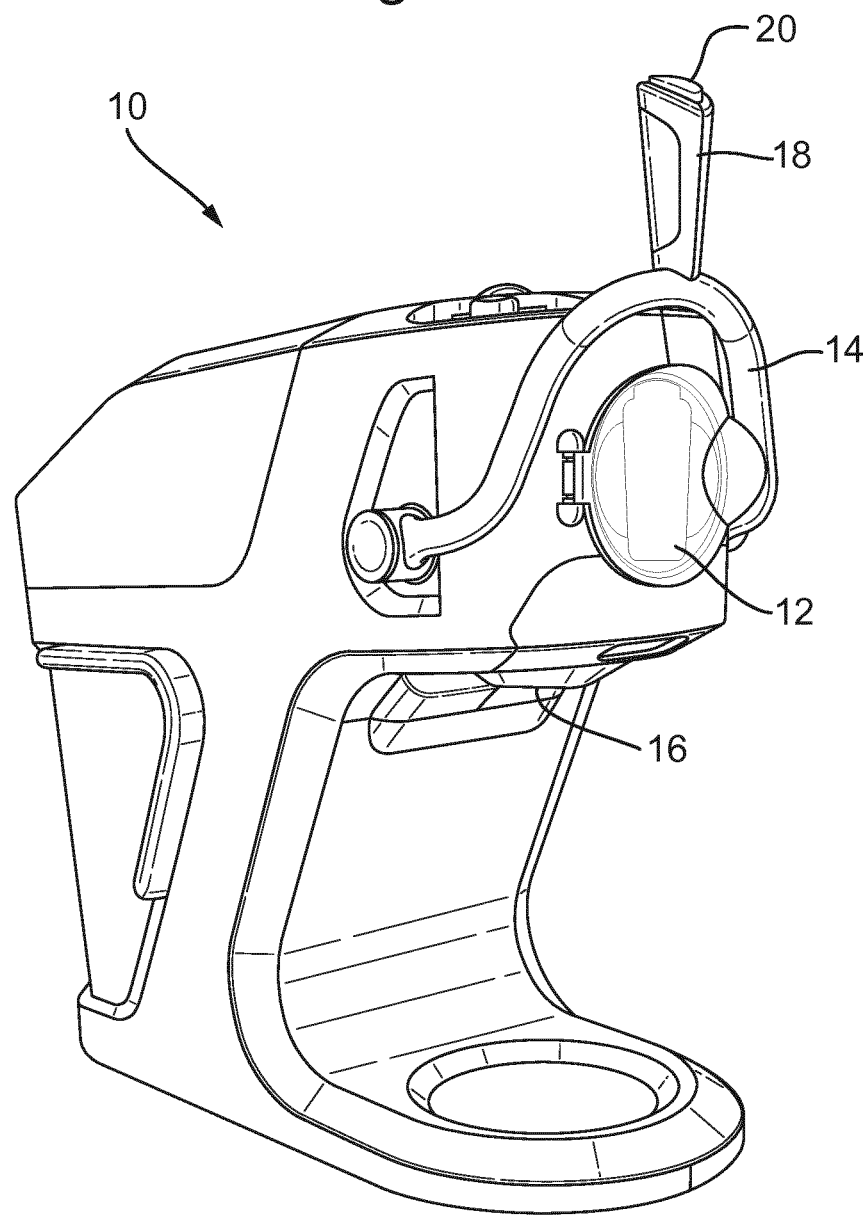
FIG. 1 is a perspective view of an apparatus according to the present invention.

Turning to the figures, FIG. 1 shows an apparatus 10 according to the invention which is adapted to deliver a frozen confection, e.g. ice cream, and associated particulate material added at the moment of delivery of the frozen confection. The apparatus is sized to be suitable for use in the home of a user.

The apparatus comprises a source of frozen confection (not shown) and a container 12 for containing a source of particulate material.

The apparatus has a handle 14, the downwards movement of which actuates the delivery of the frozen confection out of the outlet 16. The handle also comprises a grippable portion 18 which comprises a button 20 on the end thereof. Pressing button 20 actuates the delivery of the particulate material to be delivered onto the flowing surface of the frozen confection material.

Figure 2:
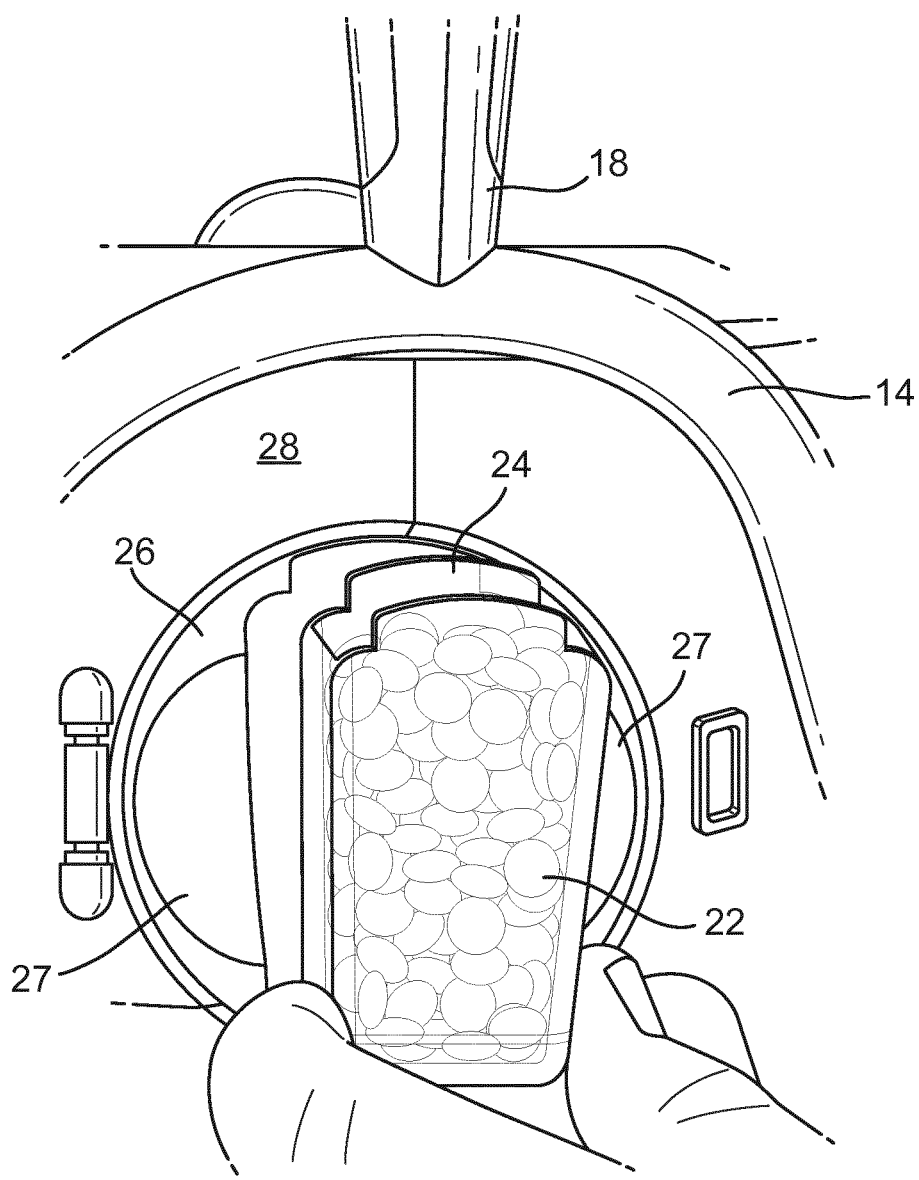
FIG. 2 is a closeup perspective view of the container of the apparatus shown in FIG. 1 removed from the apparatus.

FIG. 2 shows a close-up view of container 12 filled with particulate material 22 and fully removed from the apparatus 10 showing that it is not integrally formed with the apparatus and is fully removable by gripping the sides of the container and pulling by hand. The container can be seen to have an open exit 24 at its uppermost end.

The container 12 has been removed by the end user and filled with particulate material 22 outside of the apparatus.

As can be seen the open exit is large and takes up the entirety of one end of the container. This helps to facilitate the addition of particulate material by the end user.

Also shown is a rotatable housing 26 which is rotatable within stationary housing 28. Rotatable housing 26 has two indented regions 27 to facilitate to allow a user's fingers while gripping the container to place and remove the container from the stationary housing 28.

When container 12 is placed within the rotatable housing 26 and stationary housing 28 the open exit 24 is blocked by their presence in the orientation shown in FIG. 2.

Figure 3:
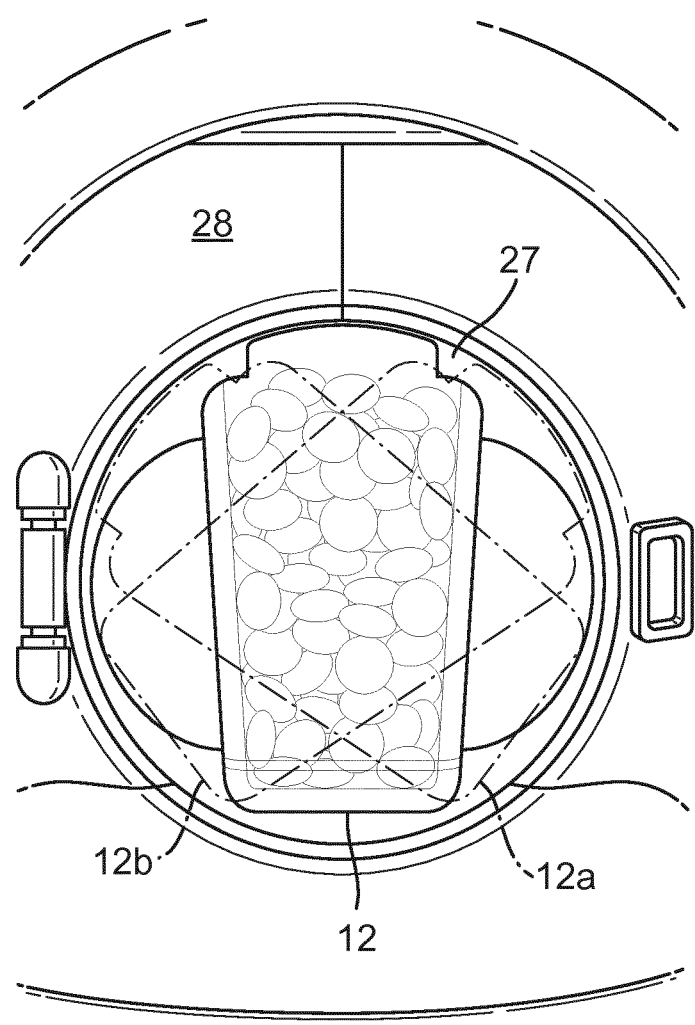
FIG. 3 is a close-up perspective view of the container of the apparatus shown in FIG. 2 containing particulate material.

As can be seen in FIG. 3, container 12 can rotate by virtue of being mounted within rotatable housing 26. Rotatable housing 26 is mounted to be rotatable within stationary housing 28. The rotation of the rotatable housing is controlled by a motor (not shown) contained within the apparatus body.

Thus, in use the container 12 rotates and thus the open exit 24 follows a pathway which is a vertical circle. The container is also shown in angled positions 12a and 12b, however in both positions the open exit 24 remains covered by the presence of the rotatable housing 26 and stationary housing 28. However the stationary housing contains an opening (not shown) in its lower region, so that when the open exit 24 of the container 12 passes though the lower region of the rotation, there is overlap between the open exit 24 and the opening in the stationary housing.

As the container continues to rotate the region of overlap firstly increases up to a maximum degree of overlap when the container is fully vertically inverted. As the container continues to rotate the degree of overlap begins to reduce until the open exit 24 is once again fully blocked by the stationary housing 28.

Figure 4:
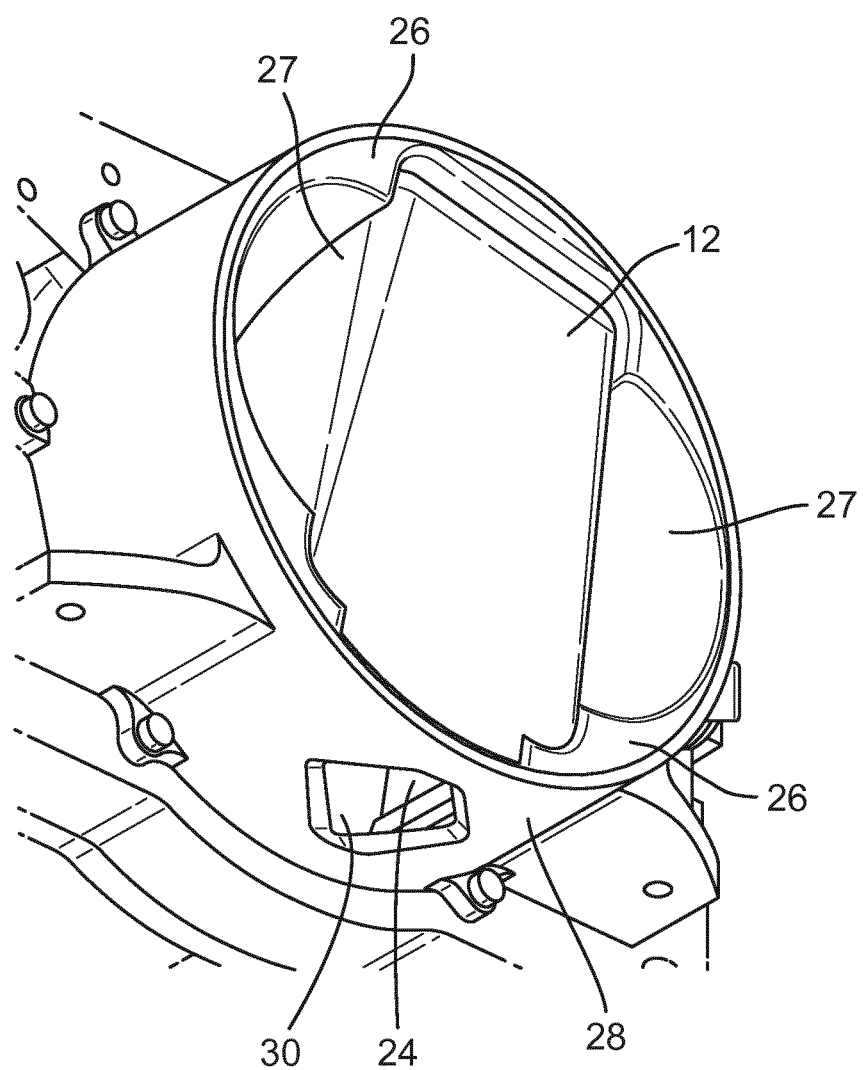
FIG. 4 is a perspective view of the internal structure of the region of the apparatus surrounding the rotating container.

FIG. 4 shows the internal structure of the apparatus in the region of the container 12. The enclosing casing has been removed to aid visualization of the internal structure. This clearly shows the stationary housing 28 within which is rotatably mounted the rotatable housing 26.

Also shown is the opening 30 in the stationery housing 28. As the rotatable housing 26 rotates within the stationary housing 28, container 12 also rotates until the container has moved to an almost fully inverted position, as shown in FIG. 4. At this point there is overlap between the open exit 24 and the opening 30. As a result of the overlap, stored particulate material 22 can fall out of the container via open exit 24 and opening 30.

As can be seen in FIG. 4, the opening 30 has a gradually tapering arrangement, so that the degree of overlap changes gradually as the open exit passes through the lower region of its pathway. In addition this arrangement provides for a slicing action so that any particulate material that is trapped in the closing region of overlap is more easily sliced or crushed as the region of overlap closes.

Figure 5:
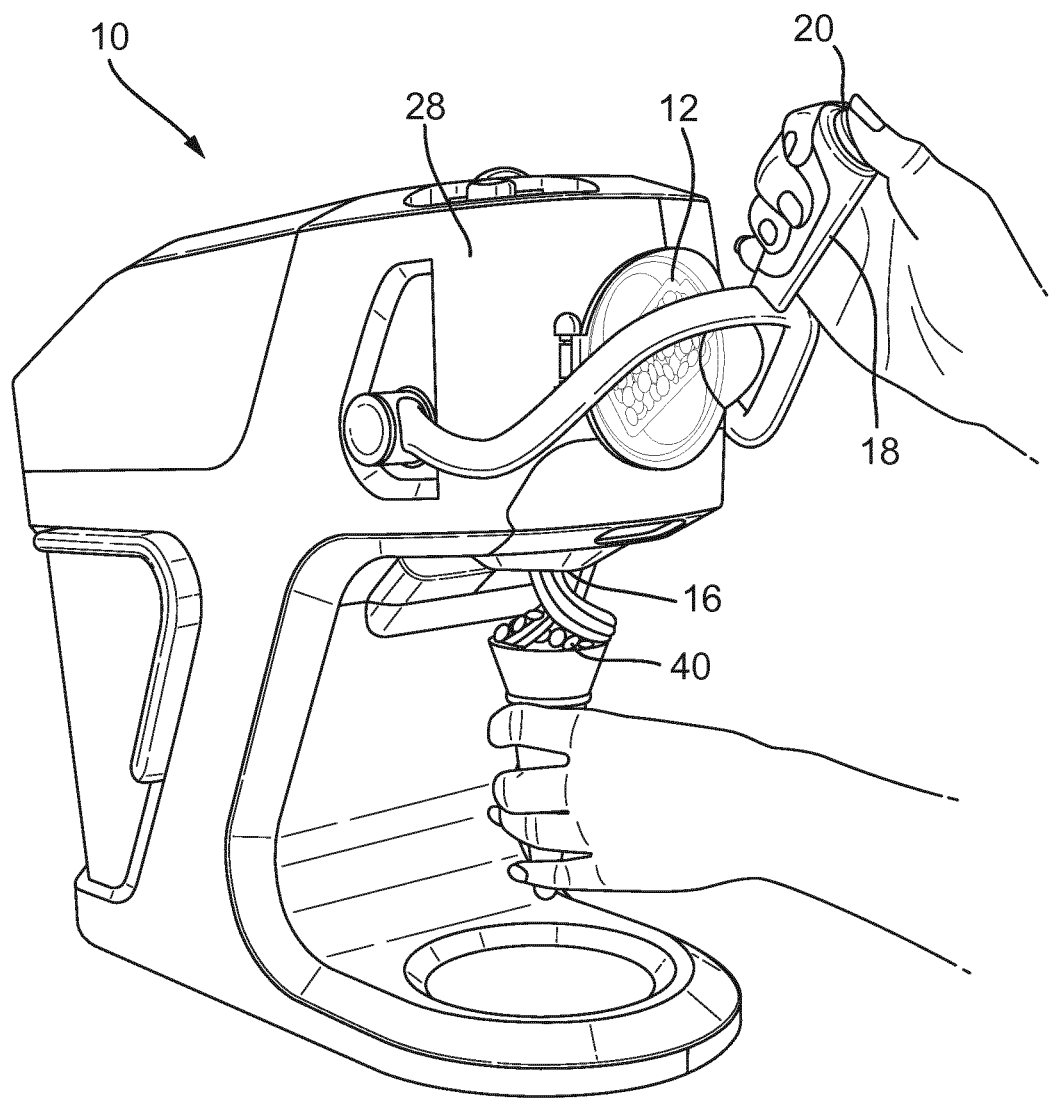
FIG. 5 is a perspective view of the apparatus shown in FIG. 1 in use dispensing a single serving.

FIG. 5 shows an image of the apparatus 10 in use delivering a single serving 40 to a consumer.

In use, an end user grips handle 18 and pulls the handle to initiate dispensing of frozen confectionery, e.g. ice cream, which is dispensed from outlet 16. Whilst the ice cream is being dispensed, the end user also presses button 20 which actuates a motor (not shown) which drives the rotation of container 12. The button 20 comprises a gradual sensor, which detects the amount by which the button has been pressed. The more the button 20 is pressed the faster the container rotates.

Each time the open exit 24 of the container 12 passes through the lowermost point of rotation a portion of particulate material is deposited to fall out of outlet 16 and brought into contact with the frozen confectionery e.g. ice cream.

In addition, the apparatus is programmed so that the speed of rotation is constant when the open exit 24 is in its lowermost position and there is overlap between the open exit 24 and the opening in the stationary housing 28. This is irrespective of the degree of depression of button 20.

Thus, the amount of particulate material dispensed is approximately in proportion to the number of revolutions of the chamber. In turn the number of revolutions of the chamber is determined by how far the end user depresses button 20. In this way an end user can dispense a single serving of frozen confectionery with as little (even none at all) or as much particulate material as is desired for that serving.

The invention claimed is:

1. An apparatus for delivering particulate material to a frozen confectionery material to provide a single serving to a consumer, the apparatus comprising
    a storage chamber for storing the particulate material, and
    a supply of frozen confectionery,
    the chamber having an open exit, wherein the chamber is adapted to be rotatable in use such that the open exit follows a pathway having both an upper region and a lower region, and arranged to pass through the lower region at a non-zero speed a plurality of times during a single serving;
    the open exit being sized to allow a portion of stored particulate material to fall out of the chamber via the open exit under gravity each time the open exit passes through the lower region of the pathway,
    the apparatus also being arranged to bring particulate material that has left the chamber into contact with the supply of frozen confectionery the arrangement being such that when passing through the upper region of the pathway no particulate material enters the chamber.

2. An apparatus according to claim 1, wherein the rotating chamber rotates within a stationary housing, the stationary housing blocking the open exit but having an opening which overlaps with the open exit when it passes through the lower region of the pathway.

3. An apparatus according to claim 2, wherein the open exit and the opening in the stationary housing are shaped such that the region of overlap, as the open exit moves away from the lower region of the pathway and the region of overlap doses, is shaped to taper providing a gradual dosing of the region of overlap.

4. An apparatus according to claim 1, wherein the chamber rotates about a substantially horizontal axis, the pathway thereby being a substantially vertical circle.

5. An apparatus according to claim 1 wherein the chamber is adapted to rotate in one sense only during a single serving.

6. An apparatus according to claim 1, wherein the chamber is not integrally formed with any other component of the apparatus.

7. An apparatus according to claim 1 which is arranged to provide the supply of frozen confectionery by extruding it through a nozzle simultaneously with the rotation of the chamber.

8. An apparatus according to claim 1 which is arranged to allow the open exit to pass through the lower region at least 5 times during a single serving.

9. An apparatus according to claim 1, wherein the rotation of the chamber is provided by a motor.

10. An apparatus according to claim 9, wherein the motor is actuatable by a user selectable input.

11. An apparatus according to claim 10, wherein the user selectable input allows variation in the speed of rotation of the chamber in use.

12. An apparatus according to claim 11, which is adapted to fix the speed of rotation at a substantially constant value whilst the open exit overlaps with the opening in the housing wherein the rotating chamber rotates within a stationary housing, the stationary housing blocking the open exit but having an opening which overlaps with the open exit when it passes through the lower region of the pathway, the arrangement being such that when passing through the open region of the pathway no particulate material enters the chamber.

13. An apparatus according to claim 1, which can fit inside a cuboid container having a volume of no greater than 0.2 $m^3$.

14. The apparatus according to claim 8 which is arranged to allow the open exit to pass through the lower region more than 10 times during a single serving.

15. The apparatus according to claim 13, which can fit inside a cuboid container having a volume of no greater than 0.1 m³.

16. The apparatus according to claim 1 suitable for distributing the particulate material about a surface of the frozen confectionery.

\* \* \* \* \*